United States Patent [19]

Iwamoto

[11] Patent Number: 4,584,222
[45] Date of Patent: Apr. 22, 1986

[54] GLUED LAMINATED WOOD

[75] Inventor: Masakuni Iwamoto, Obu, Japan

[73] Assignee: Meinan Machinery Works, Inc., Obu, Japan

[21] Appl. No.: 670,152

[22] Filed: Nov. 9, 1984

Related U.S. Application Data

[62] Division of Ser. No. 494,661, May 16, 1983, Pat. No. 4,507,162.

[51] Int. Cl.$^4$ .......................... B32B 21/14; B32B 31/04
[52] U.S. Cl. ........................................ 428/57; 428/56; 428/60; 428/537.1
[58] Field of Search ................... 428/56, 57, 60, 537.1; 156/304.1, 157, 159, 299, 502; 144/346, 349, 352

[56] References Cited

U.S. PATENT DOCUMENTS

| | | | |
|---|---|---|---|
| 3,461,932 | 8/1969 | Shelton et al. | 156/159 |
| 3,686,061 | 8/1972 | Brown et al. | 156/159 |
| 3,963,552 | 6/1976 | Troutner et al. | 156/304.5 |
| 4,343,667 | 8/1982 | Hollis | 156/304.1 |

Primary Examiner—Paul J. Thibodeau
Attorney, Agent, or Firm—Brooks Haidt Haffner & Delahunty

[57] ABSTRACT

Glued laminated wood which has a novel laminated structure and may be fabricated from small-sized veneer sheets, and method of manufacturing such laminated wood are provided. The glued laminated wood in its continuous form is made from a series of unit-length veneer sheets each having the same length and thickness which are laminated in a laid-up arrangement in which each of the veneer sheets is lapped on another and offset therefrom in the direction of its length at a regular interval determined by the number of plies to be in the laminated wood product and the length of the unit veneer sheets. It has a novel structure in that each veneer sheet therein has tandemly spaced straight length portions which are parallel to each other, but successively displaced from each other in the direction of the thickness of the product, there being a somewhat S-shaped curved length portion of the veneer sheet between any successive pair of these straight length portions. The number of such straight length portions in each unit veneer sheet is equal to the number of plies in the product being made, and the length of each such straight length portion is nominally determined by dividing the length of the unit veneer sheet by the number of plies.

12 Claims, 34 Drawing Figures

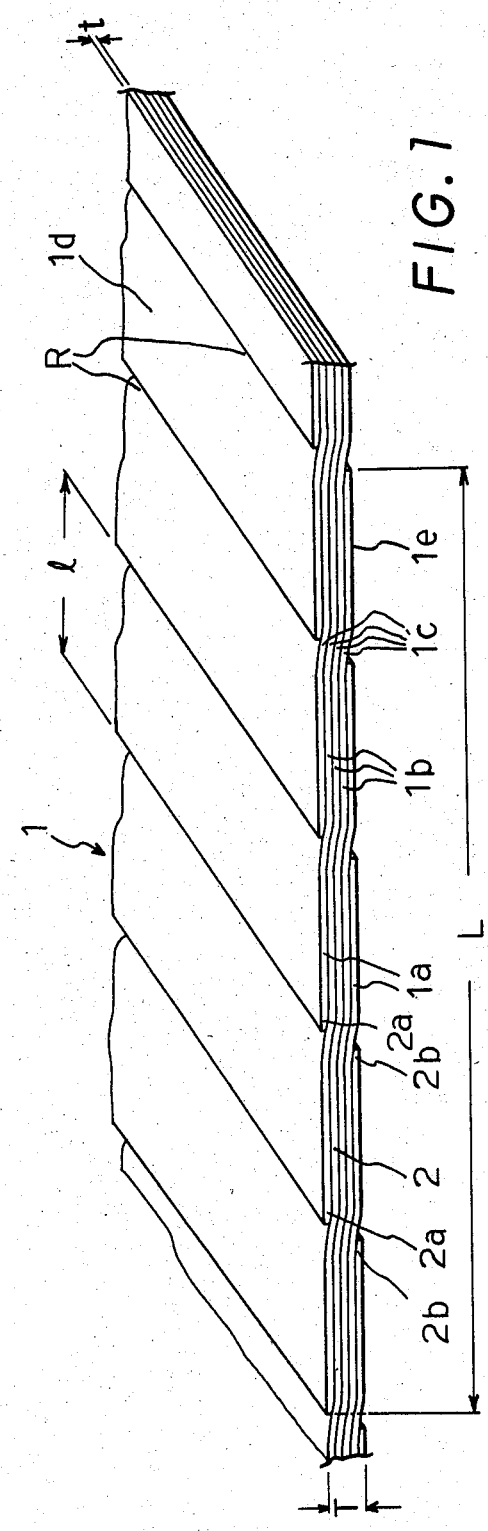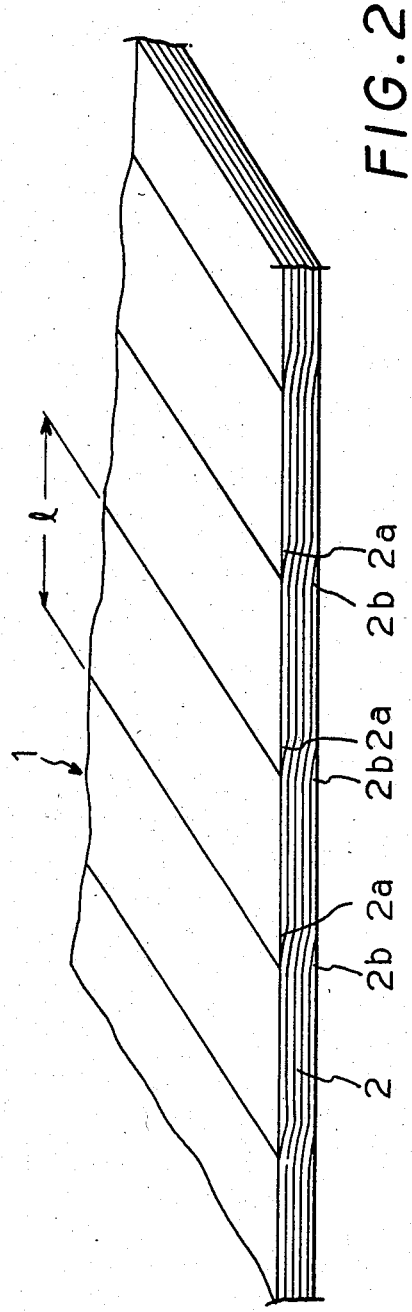

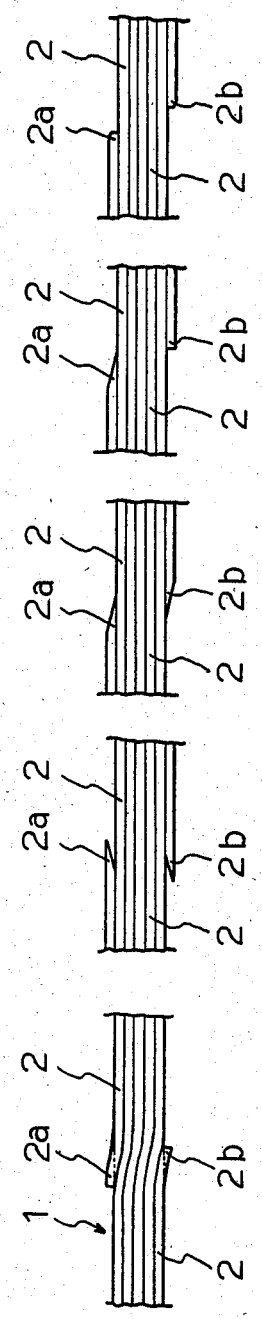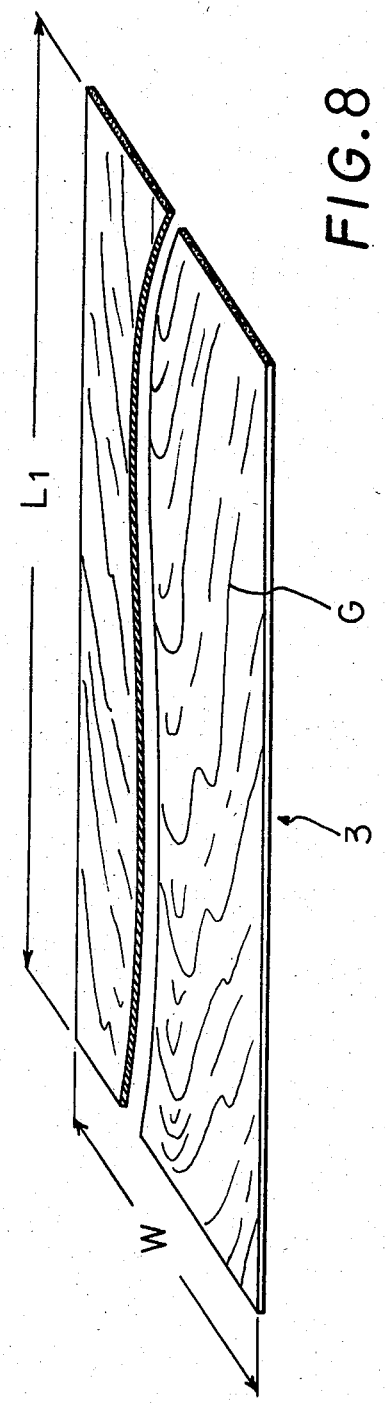

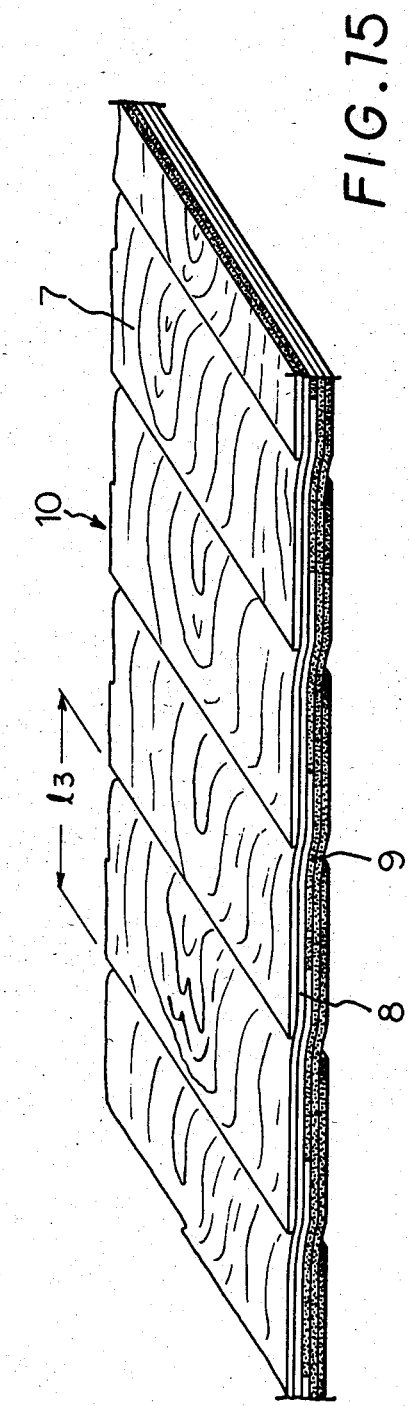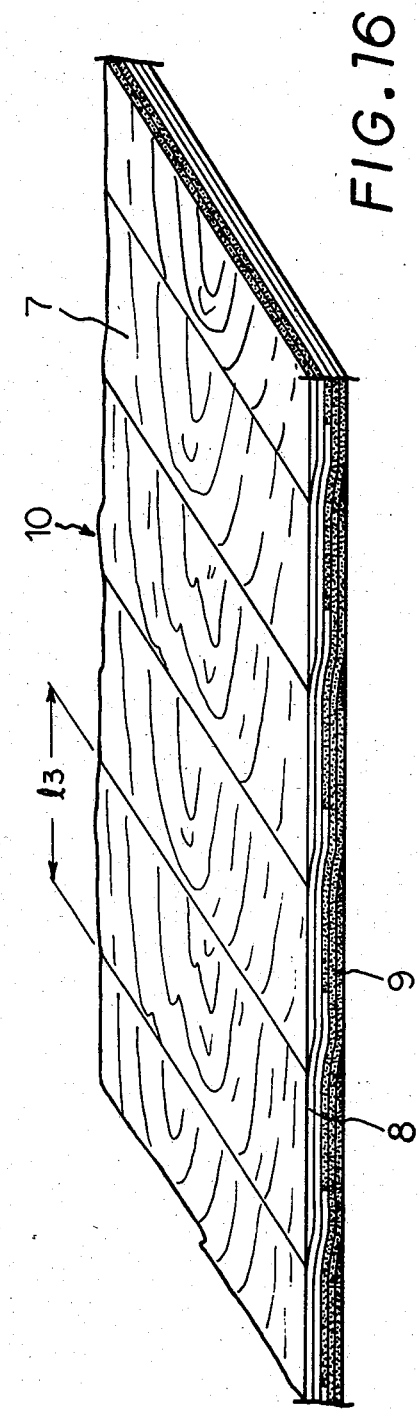

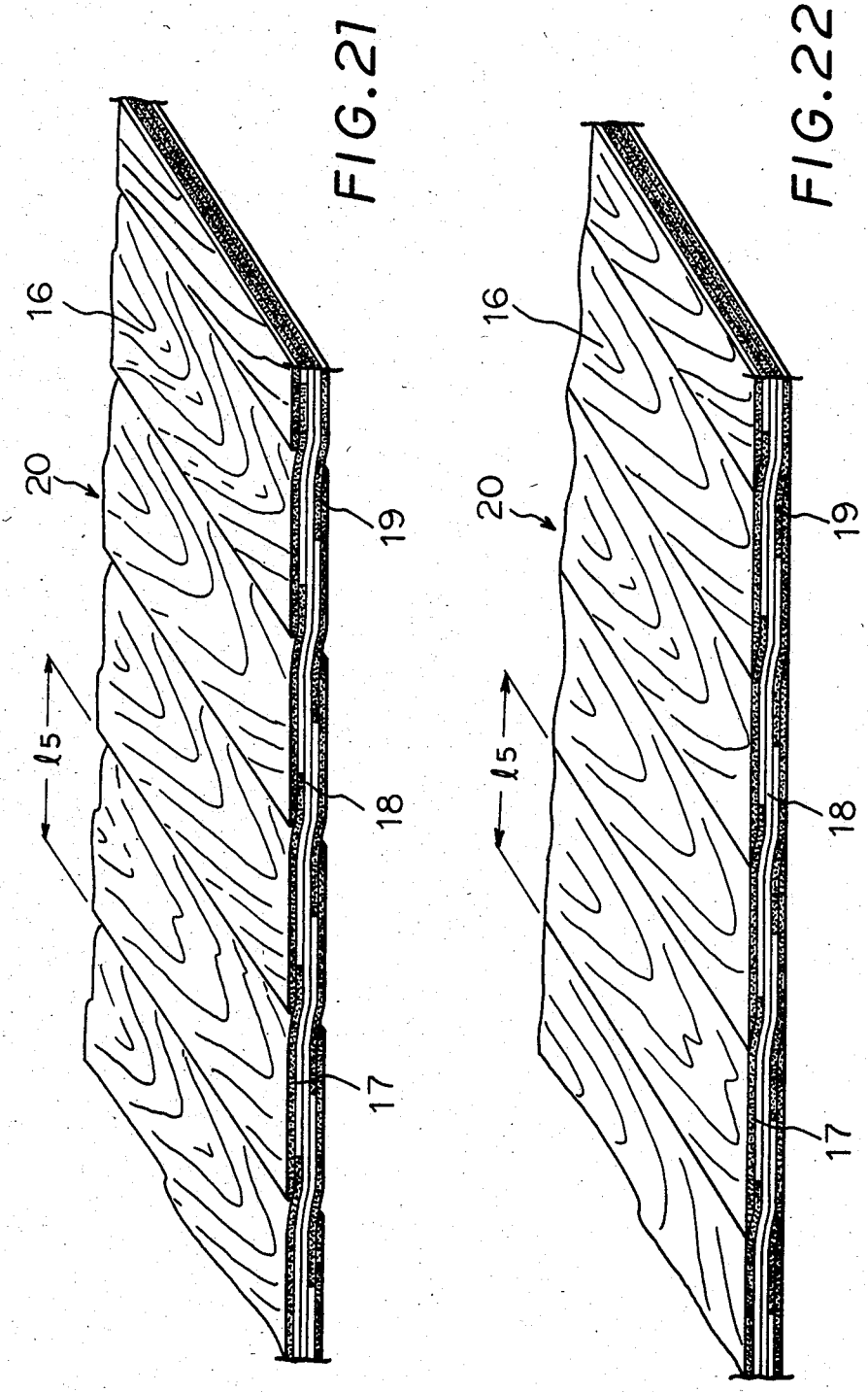

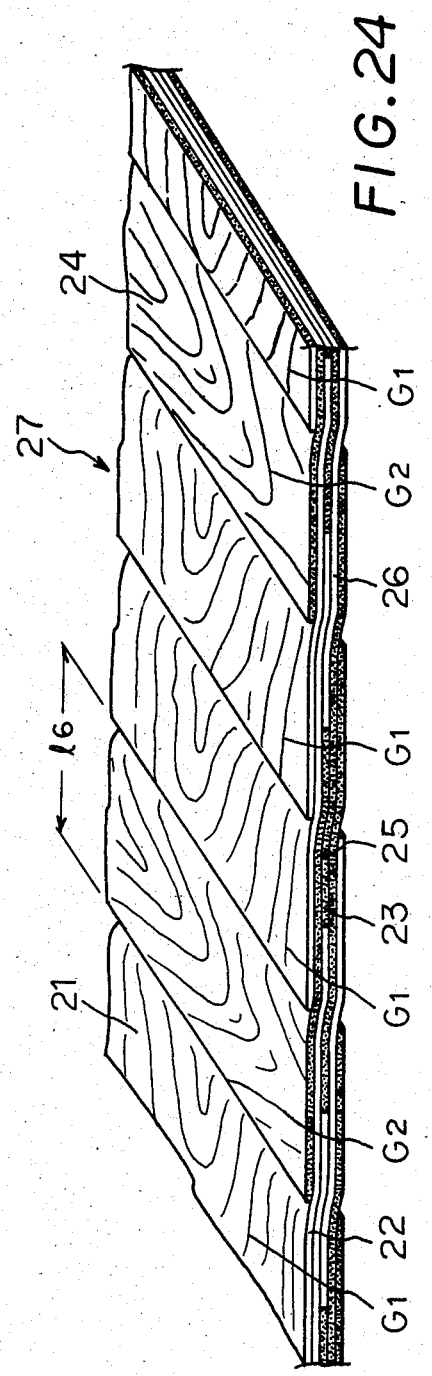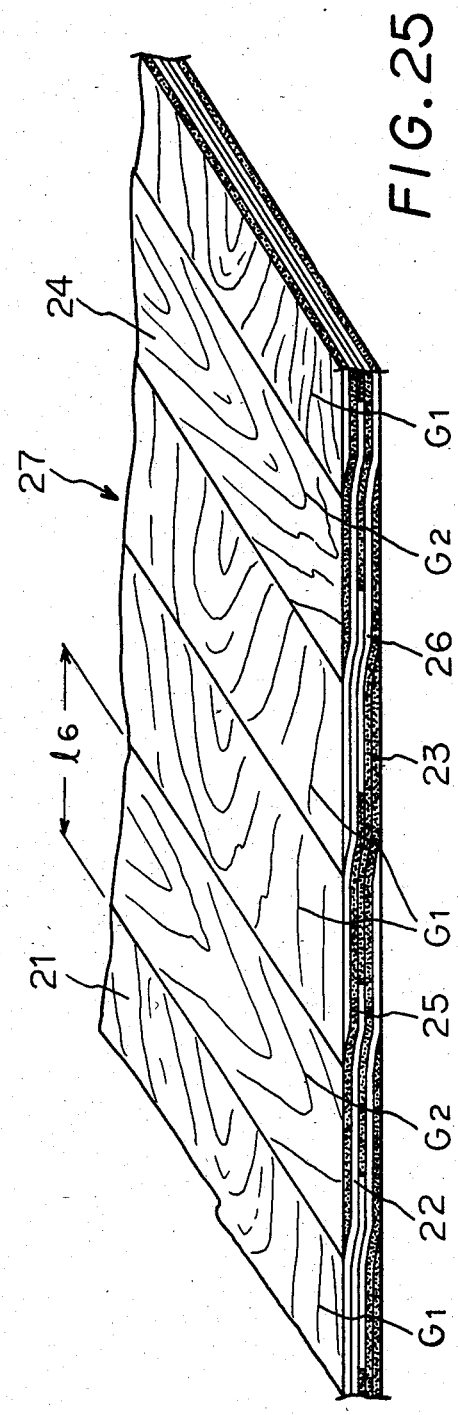

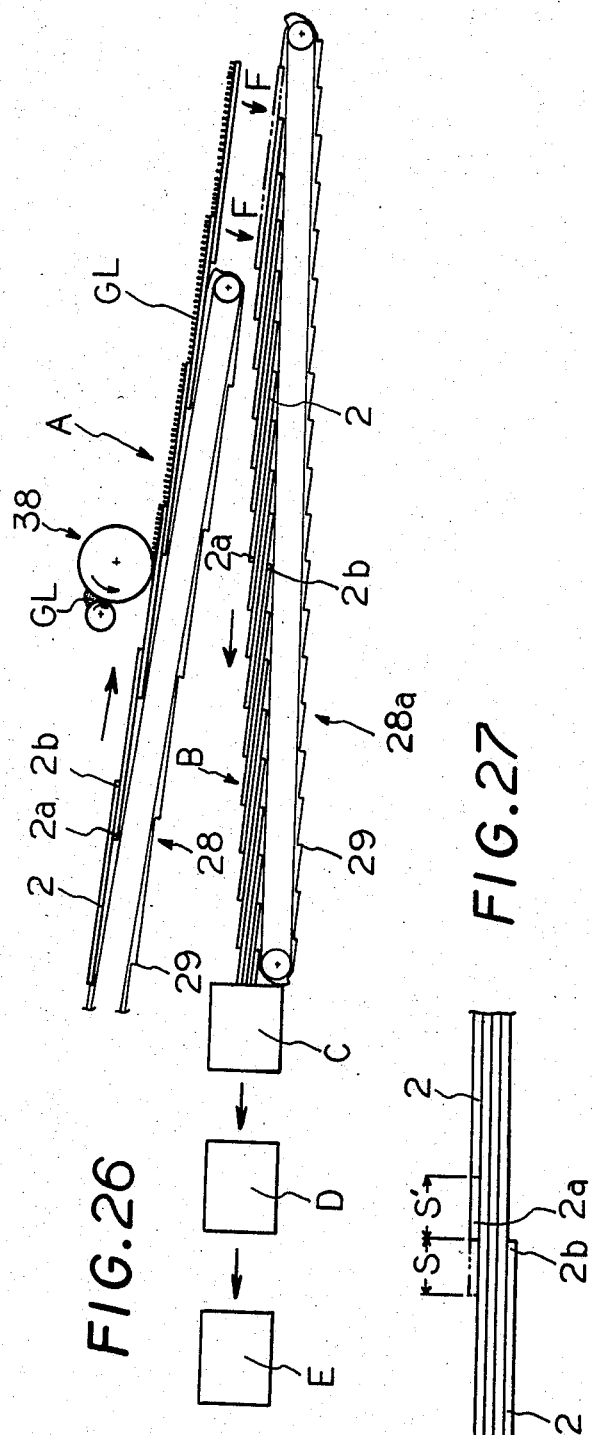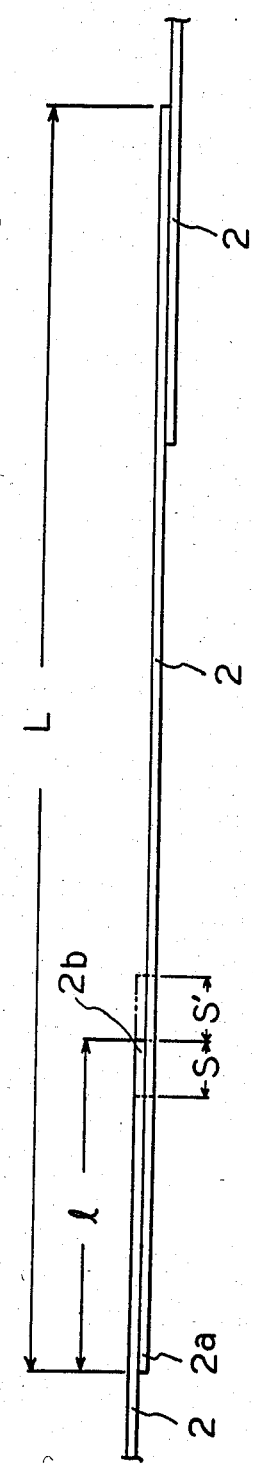

GLUED LAMINATED WOOD

This is a division of application Ser. No. 494,661, filed May 16, 1983, now U.S. Pat. No. 4,507,162.

FIELD OF THE INVENTION

The present invention relates generally to glued laminated wood, including plywood and to a method of manufacturing the same. More specifically, it relates to glued laminated wood having a novel laminated structure of veneers and to a method of manufacturing the same.

BACKGROUND OF THE INVENTION

In the so-called improved woods, several types of sheet or board materials are available, among which a glued laminated wood, including plywood is one of the most popular wood sheet materials.

In general, glued laminated wood which is composed of plural layers of veneers laminated or glued together into a sheet form achieves its thickness from the thicknesses of the individual component veneers and the number of layers of such component veneers. Such glued laminated wood, including plywood, as compared with sawn lumber, exhibits improved uniformity in strength and provides a useful wood sheet material which can be made in much larger areas. Therefore, such glued laminated wood, including plywood comes in a great variety of sizes and thicknesses, and can be laminated in different ways to meet varying requirements of the market. It is therefore used for a wide range of applications including, construction, housing, furniture, etc.

Under present circumstances of limited supply and therefore increasing prices of logs, it is an urgent task of every manufacturer to establish a manufacturing system which can permit production of various kinds of glued laminated wood sheets or panels having different lengths, widths and thicknesses with the highest possible yield rate and the minimum cost in production, labor and materials, in order to fulfill the above-said versatile demands of the market. In addition, it is a potential task of the producer to develop new fields of application for such glued laminated wood through further improvements of its inherent advantages.

It is evident that the above-mentioned urgent problems cannot be solved by glued laminated wood having conventional structure which inevitably calls for and requires selection of component veneers whose sizes are determined by the sizes of the laminated wood sheets or panels to be made. For example, it is presently necessary to cut veneer sheets from a log which is eight feet long in order to make a typical 4'×8' plywood panel, for reasons understood by those familiar with the manufacture of plywood. This requirement makes conventional plywood panels more costly. It is therefore believed that an effective approach to the problem would be to establish a technology by which various sizes of glued laminated wood including plywood may be fabricated from veneers of a reduced number of sizes or, most preferably, from veneers of only one size. Moreover, it would be a significant advance if glued laminated wood panels could be manufactured from veneers which are smaller than the intended panel size. In other words, the present invention is intended to provide more effective utilization of veneers. This is because, in the manufacture of glued laminated wood, the process involved in making veneers from logs is more problematic and calls for more labor than does the process of making the laminated wood from the veneers. Thus, improvements in the former process can make a greater contribution to the reduction of costs and to the simplification of laminated wood manufacturing as a whole. However, when realizing a technology which could make possible production of various glued laminated wood sizes from veneers of a reduced number of veneer sizes or of a single size, it would be important to prevent the introduction of any new defects in the products which would be made in that way. The glued laminated wood and the method for its manufacture according to the present invention were developed with these considerations in mind.

Published Japanese Patent Application No. 104006 (1976) shows glued laminated wood composed of a series of short veneers which are all parallel-laminated in such an arrangement that each veneer is offset or shifted with respect to its adjacent veneer at a regular interval of length, and the ends of all of the veneers are exposed on both faces of the sheet. However, the glued laminated wood product of the present invention is different, and is produced in a different way.

It is an object of the present invention to provide glued laminated wood which has improved veneer lamination and is economical to manufacture.

It is another object of the invention to provide glued laminated wood which, when its length and width are given, can be made from veneers whose lengths and/or widths are smaller than those of the laminated wood product to be made.

It is another object of the invention to provide glued laminated wood which can be made longer without being influenced by the given length and/or width of the veneers therefor.

It is still another object of the invention to provide glued laminated wood which can be made in many sizes or dimensions from veneers whose number of sizes or dimensions is reduced.

It is still another object of the invention to provide glued laminated wood which can be made in various forms of veneer lamination.

It is still another object of the invention to provide glued laminated wood which, after forming, is acceptable in appearance and can be used without further processing.

It is another important object of the present invention to provide a method of manufacturing the glued laminated wood product contemplated by the invention.

It is still another object of the invention to provide a continuous method of gluing and laying-up of veneers in making of the glued laminated wood product which has distinct labor saving advantages.

BRIEF DESCRIPTION OF THE INVENTION

The foregoing objects are attained by providing a continuous run of laid-up veneers which is made from a series of unit-length veneer sheets having the same length and laminated in a laid-up arrangement in which each veneer sheet is lapped on another and offset therefrom in the direction of its length at a regular interval determined by the number of plies to be in the laminated wood product and the length of the unit veneer sheets. The layers of veneers thus arranged are tacked, and glued laminated wood panels of one or more desired sizes are produced by cutting such a continuous length of laid-up veneers into the desired lengths and then pressing the cut lengths to make the exposed surfaces of the veneer sheets flush with each other. Alternatively, depending upon the arrangement and the type of hot press for forming the glued laminated wood, an indefinite and substantially continuous length of glued laminated wood, from which panels of the desired lengths may be cut, can be produced.

The glued laminated wood, including plywood thus produced has a novel structure in that each veneer sheet therein has tandemly spaced straight length portions which are parallel to each other, but successively displaced from each other in the direction of the thickness of the laminated wood product, there being a somewhat S-shaped curved length portion of the veneer sheet between any successive pair of these straight length portions. The extent of the referred to displacement of each successive straight length portion is equal to the thickness of the adjacent veneer sheet, and the number of such straight length portions in each veneer sheet is equal to the number of plies or veneer laminations in the laminated wood product being made. The length of each such straight length portion is nominally determined by dividing the length of the unit veneer sheet (measured in the direction of formation of the laminated wood) by the number of plies. Thus, the endmost straight length portions of each veneer sheet will respectively appear on the opposite faces of the laminated wood product and form a portion of such faces.

The unit-length veneer sheets are substantially flat when the necessary glue is applied to their overlapping length portions and they are laid up in the aforementioned successively lapped relation. It is apparent that all of the veneer sheets will be inclined to the horizontal and will extend across the thickness of the laid-up arrangement thereof. Preferably, the unit-length veneer sheets are laid up substantially in a continuous manner, which is followed by a tacking operation for temporarily laminating the glued plies of veneer sheets together. After tacking, panels of laminated veneer sheets of any selected sizes are cut from the continuous lamination of veneer sheets, and the individual panels are then hot-pressed to cause permanent formation of the aforementioned straight length and curved length portions in each laminated veneer sheet to produce a flattened thickness in the glued laminated wood panels and also for curing the lamination glue, thereby to fix the shapes of the veneers therein.

In its preferred embodiment, the invention further contemplates a continuous manner of application of glue to each veneer sheet, before it is laid up, by which those areas on the sheets which will appear on the faces of the glued laminated wood are automatically shielded from the glue application, yet the glue is applied to all of the areas on which it is intended. This is accomplished by arranging a single row of the veneer sheets in lapped relation on a flight conveyor, preferably located above the main laying-up conveyor and which travels in the opposite direction, and applying the glue by a glue spreader along only the top surfaces of the lapped sheets. The unit veneer sheets with the glue thus applied are then successively dropped onto the main conveyor in their intended laid-up arrangement, as will be seen.

After the glued laminated wood panels have been formed, filler material may be applied to fill in the naturally occurring grooves adjacent the ends of the veneer sheets to smooth one or both faces of the panel. Alternatively, a conventional panel-sized veneer sheet overlay may be laminated onto one or both faces, whereupon the panels will have the appearance of conventional panels. Still another alternative would be to avoid the formation of such grooves by beveling one or both ends of each veneer sheet before forming the laminated wood, as will be seen.

DETAILED DESCRIPTION OF PREFERRED EMBODIMENTS

These and other objects, features and advantages of the invention will become apparent to those skilled in the art from the following description of the basic structure of plywood and various embodiments of glued laminated wood according to the present invention, and methods for its manufacture, which description is made with reference to the accompanying drawings, wherein:

FIG. 1 is a fragmentary perspective view illustrating the basic laminated structure of veneers as it appears in glued laminated wood according to the invention;

FIG. 2 is similar to FIG. 1, illustrating the same basic laminated structure of veneers in the glued laminated wood of the invention, but wherein the veneers have beveled ends for providing uninterrupted surfaces on the plywood;

FIG. 3 is a fragmentary side view of glued laminated wood of the invention, showing a manner of veneer lamination which is slightly different from that of FIG. 1;

FIGS. 4 to 7 are fragmentary side views showing other possible end forms of each veneer and laid-up arrangements of such veneers;

FIG. 8 is a partial perspective view showing a typical unit veneer sheet which is used as a component veneer for fabricating glued laminated wood panels in accordance with the invention;

FIG. 15 is a partial perspective view of the embodiment of a glued laminated wood panel of the invention produced using the unit veneer sheets as illustrated in FIG. 14;

FIG. 16 is similar to FIG. 15, but showing another embodiment of a glued laminated wood panel produced using unit veneer sheets similar to that of FIG. 14, but having beveled ends;

FIG. 21 is a partial perspective view showing the embodiment of a glued laminated wood panel of the invention produced using a plurality of the unit veneer sheets shown in FIG. 20;

FIG. 22 is similar to FIG. 21, but showing another embodiment of a glued laminated wood panel of the invention produced using unit veneer sheets similar to that shown in FIG. 20, but having beveled ends;

Figure 29:
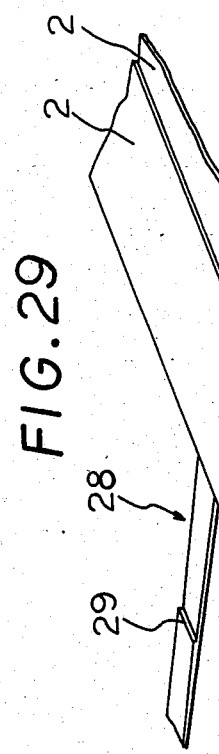
Figure 30:
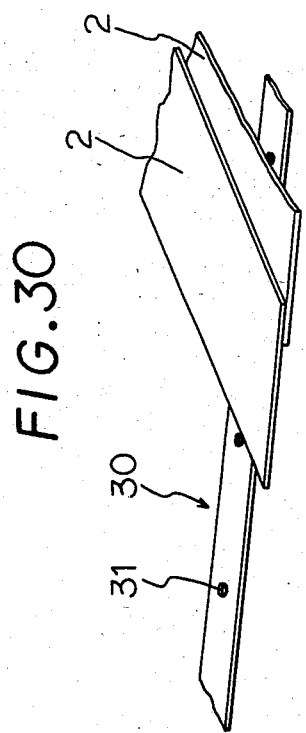
Figure 32:
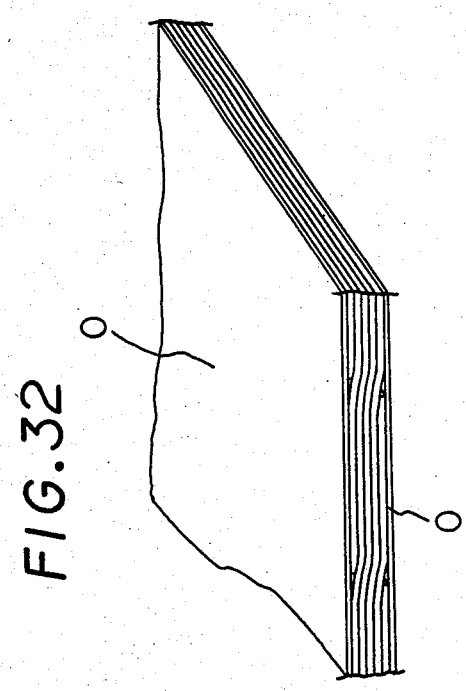
Figure 31:
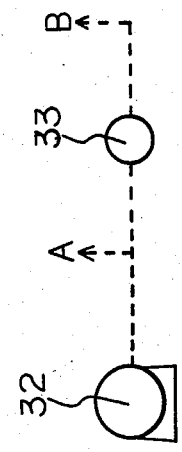
Figure 33:
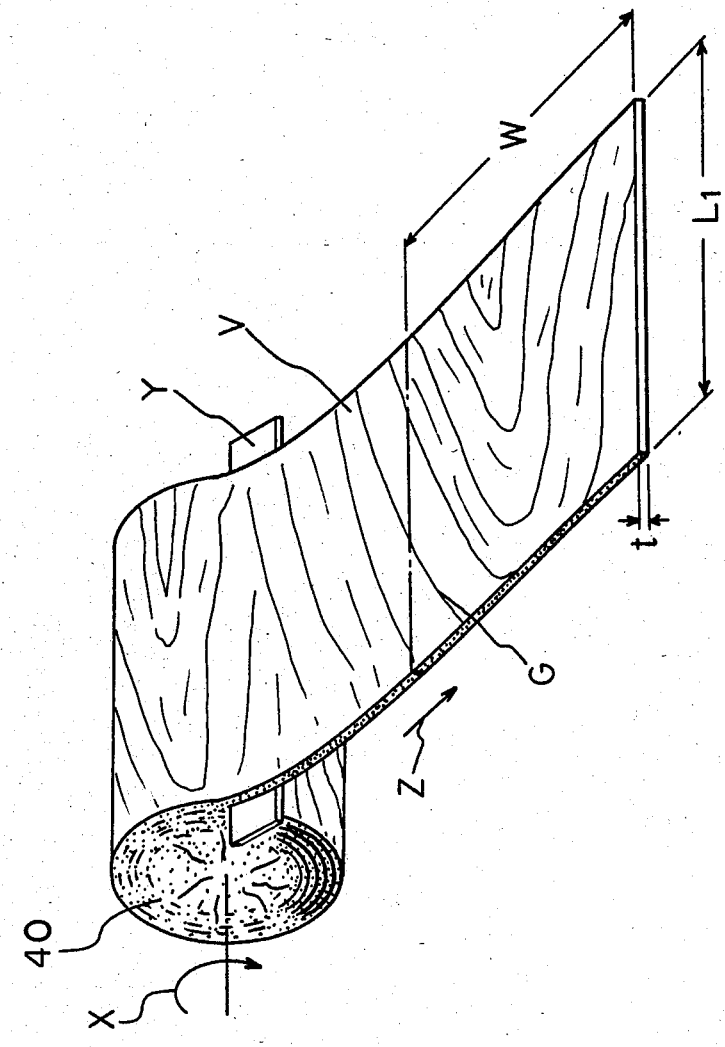

FIGS. 23(A) and (B) are partial perspective views showing respective, alternate grain arrangements in unit veneer sheets made of two pieces of undersized veneers jointed together;

FIG. 24 is a partial perspective view of the embodiment of a glued laminated wood panel of the invention produced by laying up alternate unit veneer sheets as shown in FIGS. 23(A) and (B);

FIG. 25 is similar to FIG. 24, but showing another embodiment of a glued laminated wood panel produced in the same manner as that of FIG. 24, but wherein the unit veneer sheets have beveled ends;

FIG. 26 is a schematic illustration of preferred method of manufacturing the aforesaid embodiments of glued laminated wood panels, including plywood panels, according to the invention;

FIG. 27 is an enlarged sectional view of veneers, showing possible variations in the relative lapped positions of one veneer sheet on another during the laying-up step in the glued laminated wood manufacturing method illustrated in FIG. 26;

FIG. 28 is a similarly enlarged sectional view of veneers, showing possible variations in the relative lapped positions of one veneer sheet on another during the gluing step in the glued laminated wood manufacturing method illustrated in FIG. 26;

FIGS. 29 and 30 are partial perspective views, respectively, showing alternative types of flight conveyors which may be used to convey the unit veneer sheets during the gluing and laying-up steps in manufacturing the glued laminated wood panels according to the method illustrated in FIG. 26;

FIG. 31 is a schematic diagram illustrating the operative relationships between the conveyor drives used in the gluing and laying-up processes;

FIG. 32 is a fragmentary perspective view of glued laminated wood in accordance with the invention having overlay sheets adhered to its respective faces; and FIG. 33 is a diagramatic illustration of the manner of cutting unit veneer sheets from random length logs, for use in practicing the present invention.

Referring first to FIG. 33, there is illustrated a conventional manner of producing a continuous length of veneer sheet V from a log 40 by forced rotation of the log in the direction of arrow X, against the knife blade Y, causing the veneer V, having a thickness t, to peel off in the direction of arrow Z. The wood grain G extends in the direction of the length of the log 40, as is well understood.

When making a conventional glued laminated wood panel (not shown), the length of the panel is limited to the length of the log 40; e.g., a 4'×8' plywood panel calls for a log whose length is at least 8', which means that a veneer lathe which is capable of handling at least 8' long logs has previously been necessary for making such 4'×8' panels. According to the present invention, however, any sized panels can be produced from a plurality of unit veneer sheets, such as the unit veneer sheet 3 shown in FIG. 8 whose length is indicated by L1 and its width W. The width of the panel to be made is determined by cutting the veneer V (FIG. 33) peeled from the log 40, into a width W, in this case 4'. On the other hand, since the series of unit veneer sheets 3 are laid up and laminated successively in the direction L1 (FIGS. 8 and 33), the glued laminated wood panel can be made as long as any required dimension, say 8'. In this way, the 4'×8' panel can be produced from a log 40 whose length does not have to be at least 8' long, but may be much smaller than that, say only 3' long.

Turning now to FIGS. 1 and 2, the basic laminated structure of veneers glued together to form glued laminated wood according to the present invention is illustrated wherein the glued laminated wood, though it is shown only in a partial view, is designated by reference numeral 1, and veneers constituting the layers or plies of such glued laminated wood 1 are indicated by reference numeral 2. For clarity of understanding, no wood grain pattern is shown on the laminated wood product in FIGS. 1 and 2.

The present invention contemplates the production of glued laminated wood, having any desired finite length, which may be obtained from a potentially continuous length of laminated wood formed by a series of relatively small-sized unit-length veneer sheets laminated in a regular manner so as to form such continuous length of glued laminated wood. For convenience in describing the structure of glued laminated wood according to the present invention, the veneer lamination structure of the product will be explained herein on the assumption that the glued laminated wood which is partially shown in FIGS. 1 and 2 (and also in other similar drawings illustrating individual different embodiments) constitutes a fragmentary showing of either the finished, cut laminated wood panel or the glued laminated wood as formed in a continuously extending length from which the panels may be cut, because the shapes of the veneer laminations are the same in both.

Referring to FIG. 1, the glued laminated wood in accordance with the invention is formed by laminating a series of unit veneer sheets 2, each having the same thickness t and the same length L. In the illustrated embodiment, they are built up into a five-ply or five-layer configuration, as most clearly seen at the cut-away end section of the illustrated glued laminated wood 1. In making the glued laminated wood, a series of such unit veneer sheets 2 are laminated together in a laid-up arrangement so that each of the veneer sheets 2 is partly superimposed, or lapped, on another veneer sheet 2 positioned in an adjacent layer, the upper sheet being offset from the other, i.e., having its one end spaced from the correspondingly adjacent end of the underlying sheet, at a length interval l. Thus, the successively laid-up unit veneer sheets 2 may form an indefinite, continuous length. When such a laid-up arrangement of veneer sheets 2 is pressed flat, each veneer sheet is deformed, and displaced, or stepped in the direction of the thickness T of the laminated wood, at the same regular intervals l, at the locations corresponding to the ends of the successive veneer sheets. As will be seen, each successive veneer sheet is offset from each other at the same interval l, and it will be noted that each component veneer sheet 2 thus deformed includes respective straight length portions 1a forming portions of the opposite faces of the laminated wood product, and straight length portions 1b extending parallel thereto in tandem relation and successively displaced from each other in the direction of the thickness T of the product. Between each pair of straight length portions a generally S-shaped, curved length portion 1c is formed commensurately. A finished glued laminated wood panel having any desired length may be obtained by cutting such substantially continuous length of the laminated wood.

In the continuously extending glued laminated wood having a preselected number N of veneer plies and composed of veneer sheets 2 each having a longitudinal dimension L which are offset at length intervals l, the relationships between N, L and l may be formulated such that L is substantially equal to the product of N and l, i.e., $L=Nl$. The lapping distance or lapped length portion of each veneer sheet 2 is therefore expressed as $L-L/N$. In order to ensure consistency in the number of veneer plies in the glued laminated wood 1 for attaining substantial uniformity in the product thickness throughout its length, the component veneer sheets 2 should be offset when lapped on each other at such regular intervals that the leading end 2a of any veneer sheet 2 on one face of the product and the trailing end 2b of a veneer sheet 2 exposed on the other face thereof are positioned in oppositely aligned relation to each other across the thickness T of the product, as exemplified in FIG. 1. Therefore, consistency in the number of veneer plies in the laminated wood 1 is assured by predetermining the value for l correctly with relation to the desired number N of veneer plies and the length L of each component veneer sheet 2 or, alternatively, by predetermining the value for L with relation to N and l. As a concrete example, when glued laminated wood of five-ply configuration (N=5) is to be made from veneer sheets each having a length of 300 mm (L=300), the offsetting length interval l will be about 60 mm (or 300/5). It will now be apparent to those skilled in the art, to increase the number of veneer plies in the glued laminated wood 1, the value for L is increased and/or the value for l is decreased accordingly; and that, to decrease the number of plies, the reverse is true.

In the glued laminated wood of FIG. 1 which is composed of veneer sheets 2 whose ends are square-cut, recessed portions R will inevitably be formed extending across the width of the product on both faces 1d, 1e thereof at locations which are spaced at intervals corresponding to the lengths l. Such recesses may be left as they are without any additional processing if so desired, e.g. for any particular appearance effect, although they may be easily eliminated by applying filler material therein. Alternatively, additional grooves may be formed so as to camouflage the original recesses.

Referring now to FIG. 2, the glued laminated wood 1 is fabricated substantially in the same manner as the glued laminated wood of FIG. 1, but the component unit veneer sheets 2 for its laminated construction are provided at their ends 2a, 2b with bevels formed by scarf-cutting or any other convenient process. The result is that the glued laminated wood 1 made from such beveled veneer sheets will have complete flatness without the referred to recesses R (FIG. 1) on both faces thereof. When veneer sheets 2 having such beveled ends are used for lamination, however, it is important that each sheet 2 be accurately overlapped so that the beveled faces of each pair of opposed ends 2a, 2b on the opposite faces of the product overlap each other with reference to their sectional alignment, as shown in FIG. 2, to achieve complete flatness without either recesses or projections on the product faces. In such a case, if the length L of each component veneer sheet 2 for the glued laminated wood of FIG. 2 is the same as that of FIG. 1, the length l of the veneer offset intervals should be slightly smaller in FIG. 2 than in the case of FIG. 1, because the members of each pair of opposing beveled ends 2a, 2b extend beyond each other for a slight distance, as will be understood.

It should be noted here in connection with the aforementioned relation of $l=L/N$ that in the glued laminated wood of FIG. 1, each pair of the adjacently opposite ends 2a, 2b are preferably positioned with some longitudinal spacing being provided in the sectional alignment between the extreme ends thereof, whereas in the glued laminated wood of FIG. 2 each pair of the adjacently opposite beveled ends 2a, 2b is in fully overlapping relation to each other. Thus, the value for l varies from case to case even if the values for L and N remain the same. In addition, although the length L designates the longitudinal dimension of each component veneer sheet 2 in a straightened state, the actual value for L as measured in the longitudinal direction of the formed laminated wood will be slightly smaller. Though there actually exists a slight deviation from the relationship $l=L/N$, it will be understood, having the features of the laminated wood structure of the invention in mind, that such deviation is considered to fall within the scope of the formulation $l=L/N$.

Reference is now made to FIGS. 3 to 7 showing various examples of the shapes of the veneer ends, and relative alignment relationships of the oppositely disposed respective ends 2a, 2b on opposite faces of the laminated wood.

Referring to FIG. 3 which shows in side elevation a portion of glued laminated wood 1 having five plies of veneer sheets 2 laminated together, each veneer sheet 2 has square-cut ends and is lapped on another using an offset interval such that the opposed ends 2a, 2b extend beyond each other for a slight distance, with the result that outwardly projecting portions are formed on both faces of the laminated wood. Of course, when the laid-up veneer sheets are pressed to deform the laminations, the faces of the press accommodate these projections, as will be understood. These projections on the laminated wood may be left as they are if so desired, but may be removed readily by sanding or cutting, as indicated by phantom lines, for producing substantially flat surfaces on the product faces.

FIGS. 4 to 7 show six plies of veneer sheets 2, respectively, which are just laid-up and are yet to be glued together to form the complete laminated wood product. In FIG. 4, each veneer sheet 2 has beveled ends with their beveled faces facing inwardly. The ends 2a, 2b are positioned in overlapping relation as illustrated, so that their beveled faces extend beyond and face each other. Glued laminated wood obtained by pressing these six plies of veneer sheets 2 to cause the aforementioned deformation thereof is similar to the glued laminated wood of FIG. 2, though the latter is only of five-ply structure. FIG. 5 shows six plies of veneer sheets 2 each of which has beveled ends whose beveled faces, unlike the counterparts of FIG. 4, face outwardly. Glued laminated wood resulting from such layers of veneer sheets 2 after pressing is similar to the glued laminated wood of FIG. 3 after removal of the excess material from the ends as previously described. In FIG. 6, one end of each veneer sheet 2 is beveled while the other end thereof is square-cut, and each such veneer sheet is placed so that the ends 2a, 2b are substantially in vertical alignment with each other at their extreme ends. Accordingly, after the veneer sheets 2 are deformed for laminating them into the glued laminated wood product, one face thereof will be formed flat while the other face will be formed with recessed portions therein. In FIG. 7, each component veneer sheet 2 has ends 2a, 2b which are chamfered or rounded, and which are spaced longitudinally apart on the opposite faces of the product, with reference to an imaginary line (not shown) extending perpendicular to its thickness. The resulting glued laminated wood will have recesses on both faces thereof, and the exposed edges of each veneer sheet 2 will be rounded, accordingly.

Further embodiments of the glued laminated wood of the invention will now be described with reference to FIGS. 8-25.

FIG. 8 shows a unit veneer sheet 3 having a longitudinal dimension L1 in the direction of its wood grain G. A series of such unit veneer sheets 3 are laminated together in the above-described manner for building up glued laminated wood, from which laminated wood panel 4 of the embodiment shown in FIG. 9, having a five-ply configuration, may be obtained.

Figure 9:
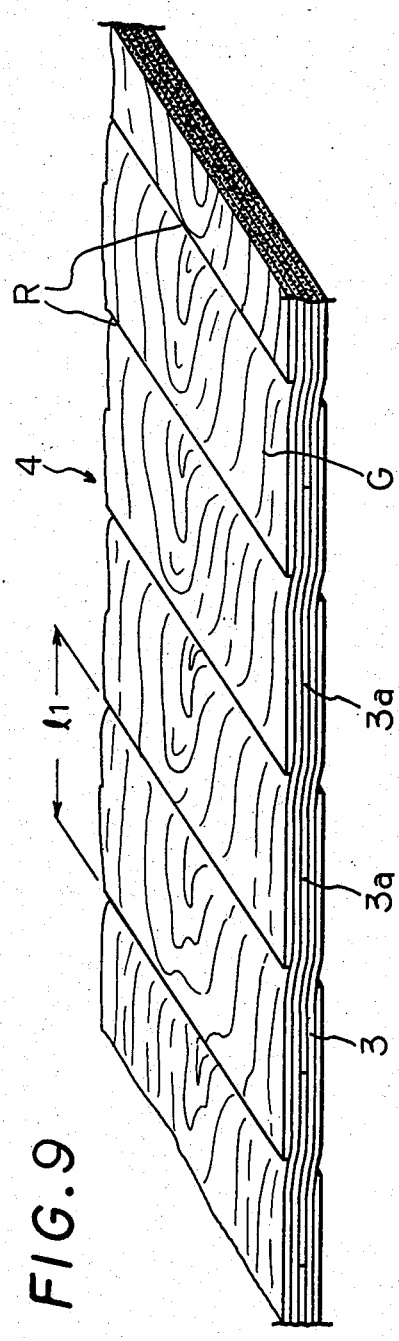
FIG. 9 is a partial perspective view showing a parallel laminated wood panel according to the invention produced using unit veneer sheets as illustrated in FIG. 8.

In the embodiment of glued parallel laminated wood 4 shown in FIG. 9, it is fabricated by parallel-laminating a series of the unit veneer sheets 3 of FIG. 8, with all of their grains G extending in the longitudinal direction of the laminated wood to be made. Therefore, each unit veneer sheet 3 will be offset in the direction of its wood grain from each adjacent veneer at an interval of predetermined length l1, so as to form a continuous length of parallel laminated wood. A panel 4 of any desired length may be cut from such continuous length of glued parallel laminated wood.

The faces of the laminated wood 4 inevitably have recesses R formed therein adjacent to the ends of each veneer sheet 3, but these may be eliminated by applying any suitable filler material therein. If desired for any reason, such recesses may be retained as they are, without any further additional processing, or additional grooving may be provided so as to camouflage the recesses. Though the veneer sheet 3 in FIG. 8 is shown as a solid sheet, it may contain therein one or more joints 3a at which two pieces of undersized veneer sheets are end-jointed to make a full-sized unit veneer sheet having the length L1, e.g. when it is desired to use veneers which are shorter than L1. Such joints may be formed easily by using any known method such as butt-jointing, scarf-jointing, or any other convenient jointing.

Figure 10:
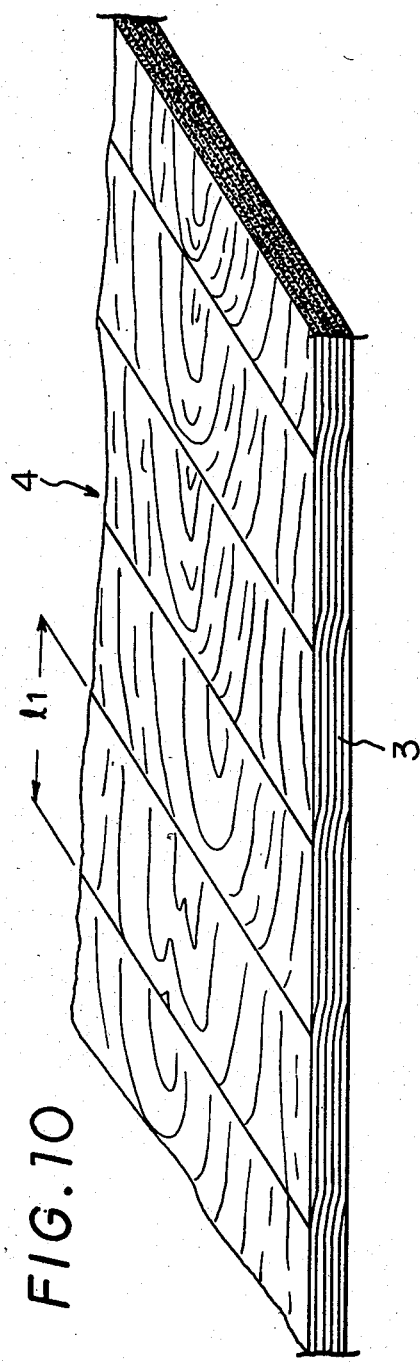
FIG. 10 is similar to FIG. 9, but showing another embodiment of a parallel laminated wood panel produced using unit veneer sheets having beveled ends.

Another embodiment of the glued parallel laminated wood 4 as shown in FIG. 10 is similar to that of FIG. 9, but differs therefrom in that the laminated wood is composed of veneer sheets 3 whose ends are beveled in the inwardly facing direction, thus corresponding to FIG. 2. This embodiment is advantageous as compared with its counterpart in FIG. 9, when continuity in surface flatness is a major concern in product quality.

Figure 11:
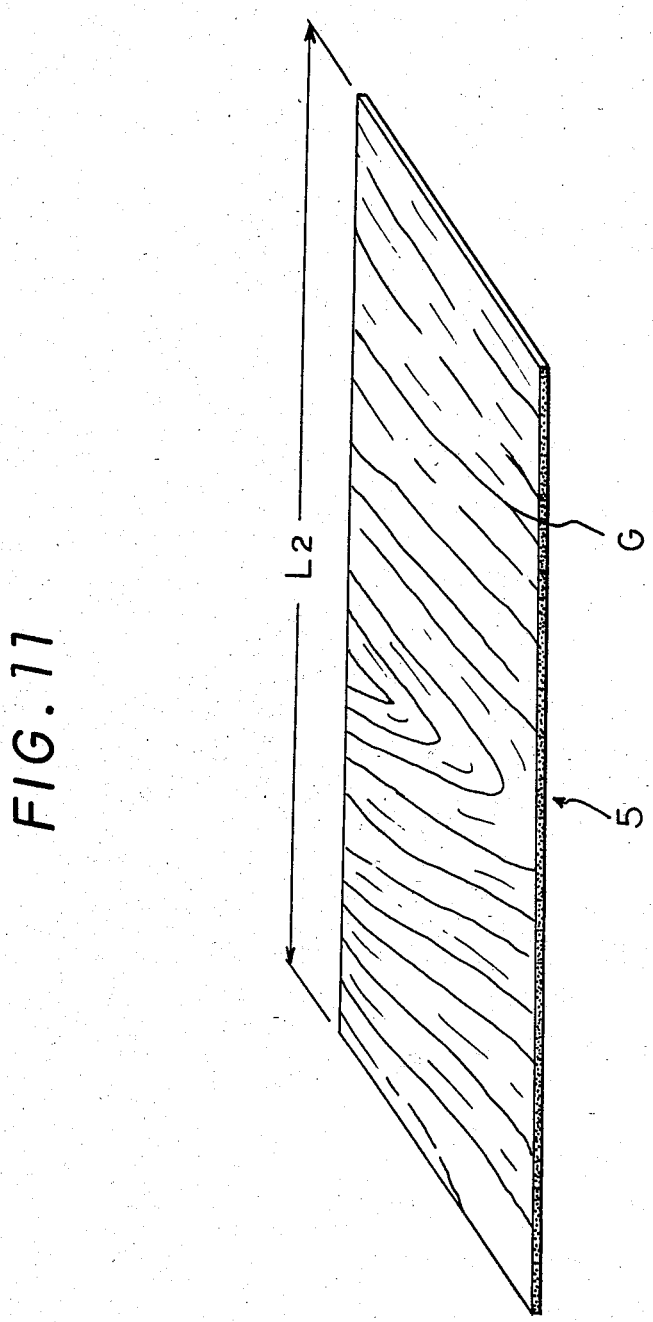
FIG. 11 is a partial perspective view showing another unit veneer sheet which is used as a component veneer for making glued laminated wood panels.

Reference is now made to FIG. 11, wherein a unit veneer sheet 5, having the dimension L2 across its wood grain G is shown. A series of such unit veneer sheets 5 are used to fabricate a substantially continuous run of glued parallel laminated wood from which laminated wood 6 of any required length as shown in FIG. 12 may be cut.

Figure 12:
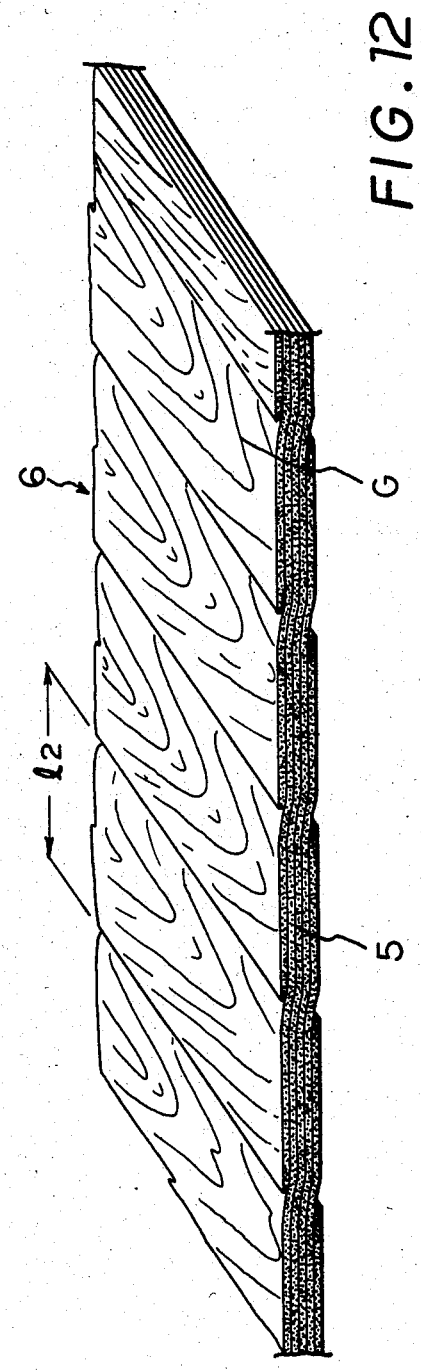
FIG. 12 is a partial perspective view showing the embodiment of a parallel laminated wood panel produced using unit veneer sheets as illustrated in FIG. 11.

In the embodiment of FIG. 12, the parallel laminated wood 6 is made by laminating a series of the unit veneer sheets 5 of FIG. 11 in parallel relation to each other with all of their grains G extending across the longitudinal direction of the product. Accordingly, each unit veneer sheet 5 will be offset, in the direction across the wood grain thereof, from each adjacent veneer sheet at a predetermined length interval l2 for forming a continuous length of glued parallel laminated wood. The laminated wood 6 of any desired length may be obtained from such continuous length of parallel laminated wood.

Figure 13:
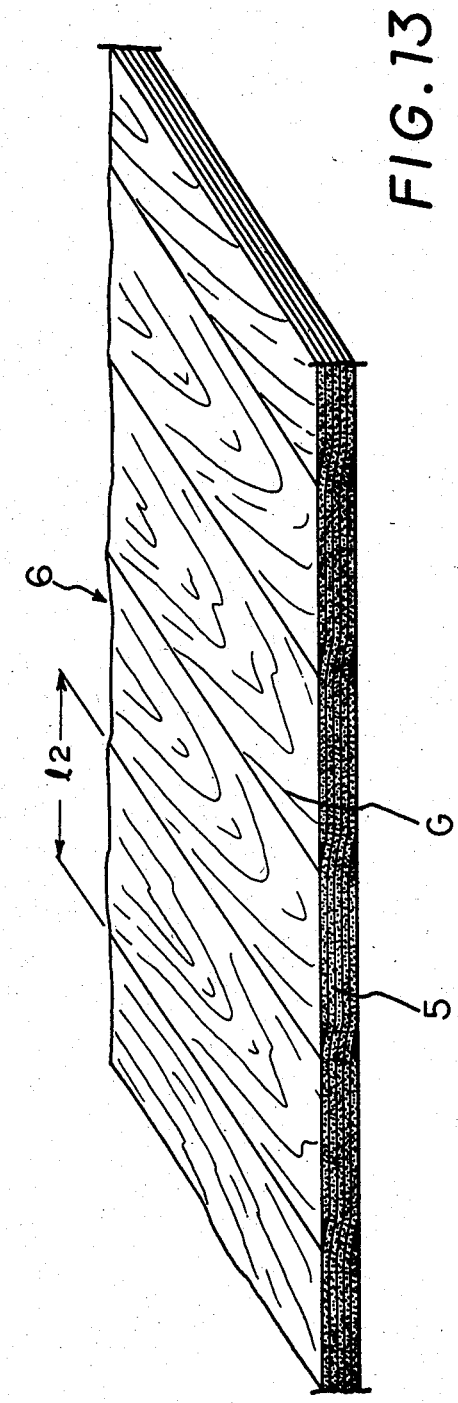
FIG. 13 is similar to FIG. 12, but showing another embodiment of a parallel laminated wood panel produced using unit veneer sheets similar to that of FIG. 11, but having beveled ends.

FIG. 13 illustrates another embodiment of the glued parallel laminated wood 6, which is made using a series of laminated unit veneer sheets 5, having beveled ends as in previous embodiments for preventing recesses from being produced on the product faces.

Figure 14:
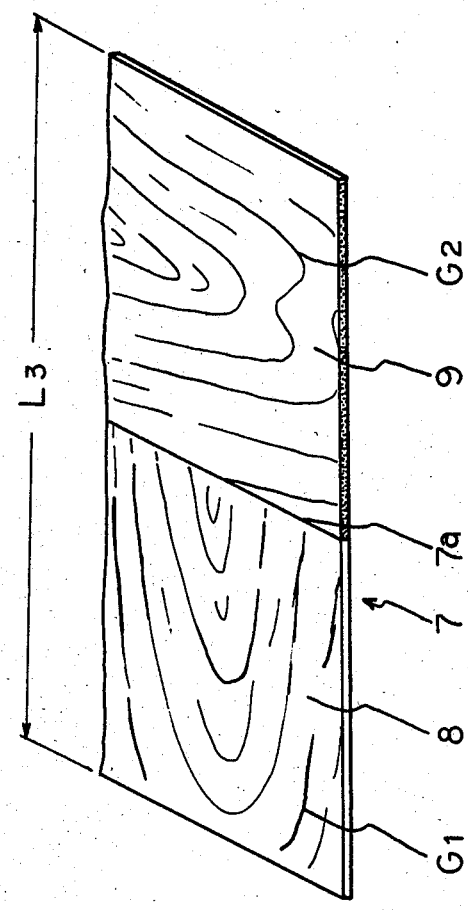
FIG. 14 is a fragmentary perspective view of a unit veneer sheet which is made using two veneer sheets jointed together.

Referring to FIG. 14, a unit veneer sheet 7 is shown which, unlike the solid unit veneer sheets shown in FIGS. 8 and 11, includes two pieces of undersized veneers 8 and 9 which are jointed together along their line of abutment 7a to make the full-sized unit veneer sheet 7 having a longitudinal dimension L3. The undersized veneer 8 on the left-hand side as shown has its grain G1 oriented in the longitudinal direction of the laminated wood to be made; while the other undersized veneer 9 has its grain G2 thereacross. When making a unit veneer sheet 7 which includes two jointed pieces of undersized veneers 8 and 9, the dimension of the veneer 8 in the direction of its grain G1 and the dimension of the veneer 9 across its grain G2 should preferably be such that either of the dimensions is greater than the interval lengths l3 (FIGS. 15 and 16) at which the unit veneer sheets 7 will be offset successively from each other in the lamination thereof for making of the laminated wood product. By so doing, the abutment line 7a may be prevented from appearing on the product faces. Furthermore, to maintain the strength of the resulting laminated wood dimension of the veneer 8 having its grain G1 along the length L3 should preferably be the sum of said interval length l3 and a dimension which is greater than five times, or more preferably in the range of from 15 to 150 times, the thickness of the veneer sheet 7 so that the jointing line 7a may not be positioned closely enough to the adjacent lapping end of its overlying veneer sheet to affect the strength of the laminated wood at such jointing line, as will be understood by those skilled in the art.

When a series of overlapped veneer sheets 7 having therein a side-to-end joint are glued together to form a laminated structure according to the invention, glued laminated wood 10 as shown in FIG. 15 will result. That is, in the illustrated case of a five-ply lamination, the upper two or three plies thereof have their grains G1 extending in the longitudinal direction of the glued laminated wood 10, while the lower two or three plies have their grains G2 set thereacross.

The embodiment of plywood shown in FIG. 16 differs from that of FIG. 15 in that the glued laminated wood is made of similar unit veneer sheets 7, but each having its ends beveled in the inward direction, each unit veneer sheet being offset from another at a slightly smaller interval, as previously explained.

Figure 17:
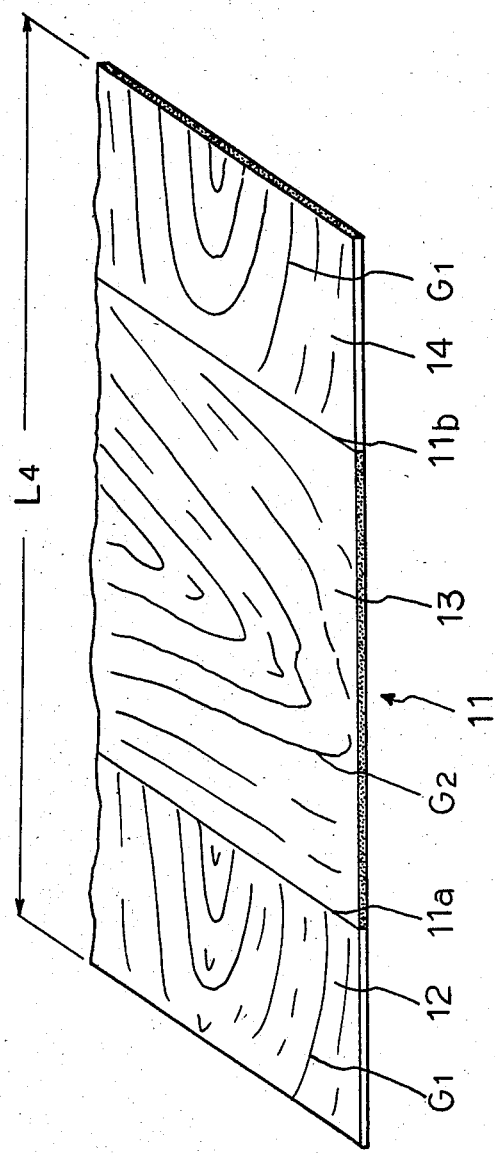
FIG. 17 is a partial perspective view of a unit veneer sheet which is made using three pieces of veneers jointed together.

FIG. 17 shows still another form of a component unit veneer sheet 11 which is integrally formed by jointing three sections of undersized veneers 12, 13 and 14, along their respective lines of abutment 11a, 11b into a unit veneer sheet 11 having a longitudinal dimension L4. In this unit veneer sheet 11, its respective end sections 12 and 14 have their wood grains G1 extending in the direction of the length L4, whereas the veneer section 13 at the enter has its grain G2 extending thereacross. Each of the dimensions of the undersized veneers 12 and 14 in the direction of their grains G2 is made greater than the interval lengths l4 (FIGS. 18 and 19) at which the unit veneer sheets 11 will be offset from each other when laminated to make the glued laminated wood product. Furthermore, the dimensions of said veneers 12 and 14 should preferably be the sum of said interval length l4 and a dimension which is greater than five times, or more preferably in the range of from 5 to 150 times, the thickness of the veneer sheel 11, for the same reasons stated previously in connection with FIG. 14.

Figure 18:
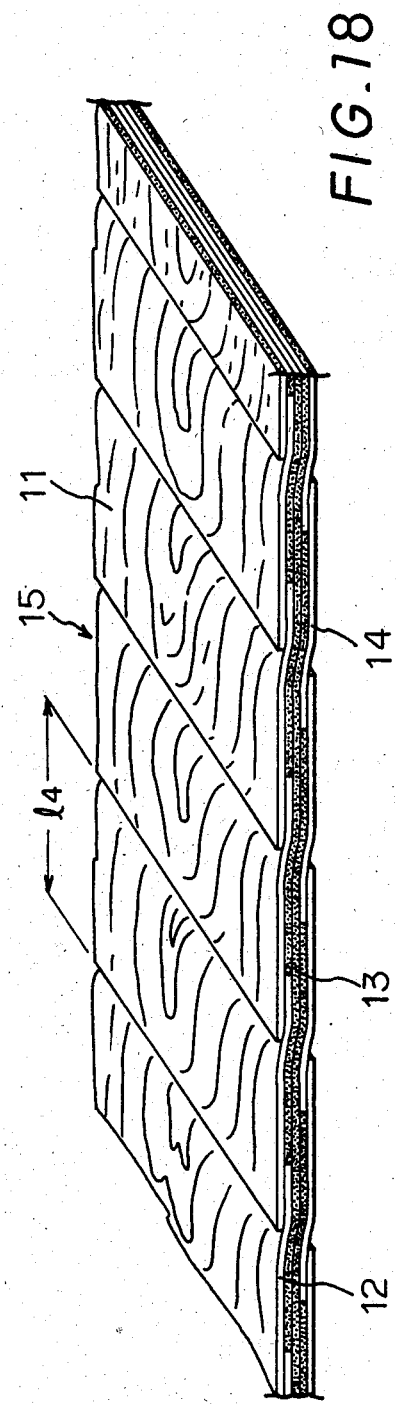
FIG. 18 is a partial perspective view showing the embodiment of a glued laminated wood panel of the invention produced using unit veneer sheets as illustrated in FIG. 17.

Laminating a series of such integrally formed unit veneer sheets 11 of FIG. 17 into a five-ply structure according to the invention will eventually produce glued laminated wood 15 as illustrated in FIG. 18. In this embodiment, a cross-banded structure which is similar to a three-ply configuration can be created, as seen clearly at the side section thereof. That is, in the case of the illustrated five-ply lamination, one or two plies of the veneer sheets 11 at the top and at the bottom of the laminated wood 15 have their grains G1 extending in the direction of the length thereof, and two or three plies at the core portion of the laminated wood have their grains G2 running thereacross.

Figure 19:
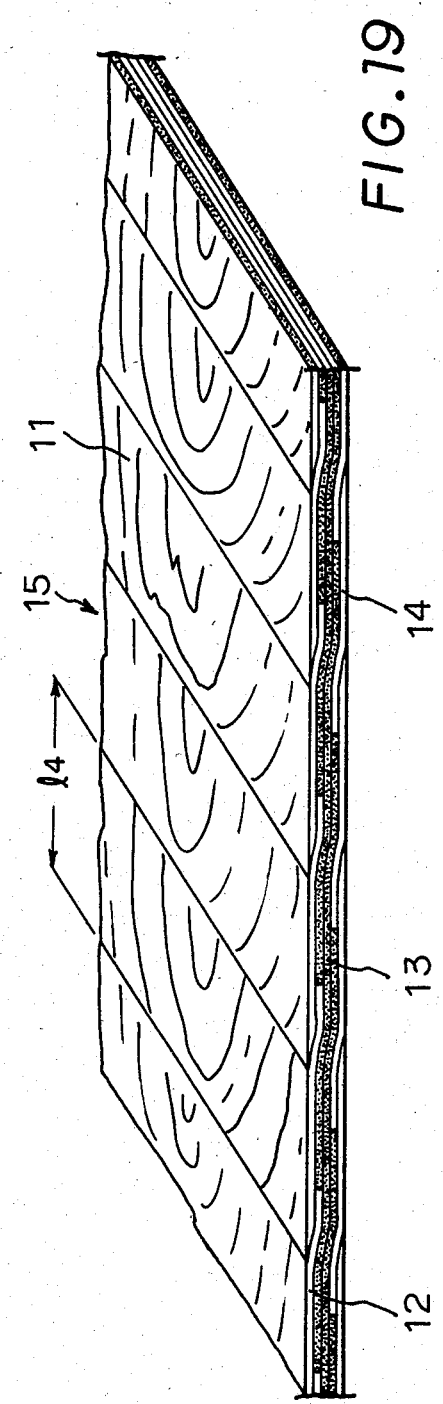
FIG. 19 is similar to FIG. 18, but showing another embodiment of a glued laminated wood panel produced using unit veneer sheets similar to that of FIG. 17, but having beveled ends.

The embodiment of the glued laminated wood 15 in FIG. 19 differs from its counterpart shown in FIG. 18 in that each component unit veneer sheets 11 therefor has beveled ends, and is offset from each of its adjacent veneer at a slightly smaller interval which corresponds with the beveling as previously explained.

Figure 20:
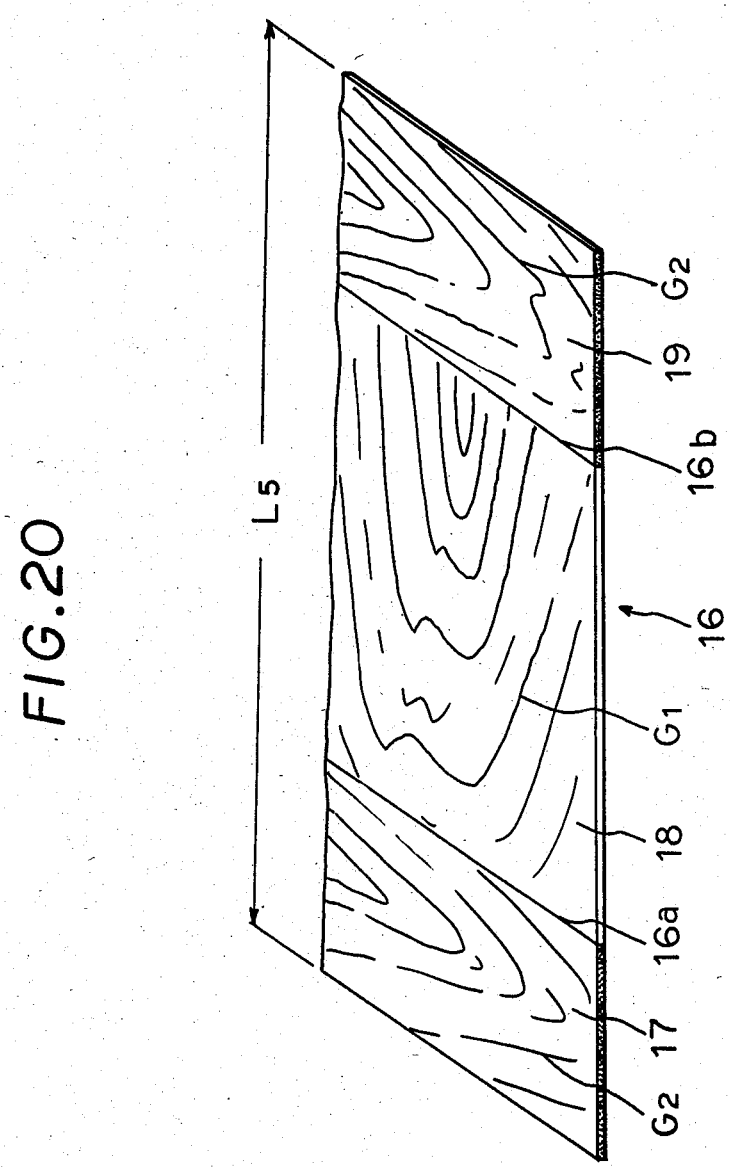
FIG. 20 is a partial perspective view showing another unit veneer sheet which is made using three pieces of veneers jointed together.

In FIG. 20, a unit veneer sheet 16 is shown which has three sections of undersized veneers 17, 18 and 19 jointed together, along respective abutment lines 16a, 16b, into the length L5 of a full-sized unit veneer sheet 16. This veneer sheet 16 is similar to that shown in FIG. 17, but differs therefrom in that the undersized veneer 18 at its center has its grain G1 extending in the direction of the length L5, whereas the veneer sections 17 and 19 at the ends have their grains G2 extending thereacross. Like the veneer sections 12 and 14 (FIG. 17), the undersized veneers 17 and 19, as measured along the length L5 or across the grains G2 thereof, have dimensions greater than the length l5 (FIGS. 21 and 22) of the intervals at which the unit veneer sheets 16 will be offset from each other in the lamination thereof into a continuous length of glued laminated wood for the same reason stated in connection with FIG. 14.

The glued laminated wood 20 which results from laminating such integrated unit veneer sheets 16 according to the invention is shown in FIG. 21. Its crossbanded structure is arranged in a manner similar to that of the embodiment of FIG. 18, although each veneer layer is reversed in respect of the direction of its wood grains.

FIG. 22 illustrates another embodiment of the glued laminated wood 20, wherein the faces thereof are formed flat, with no recesses such as those seen in FIG. 21, by providing inwardly beveled ends on each component unit veneer sheet 16, and laminating the veneer sheets with their beveled ends overlapping and confronting one another, as previously explained.

Figure 23:
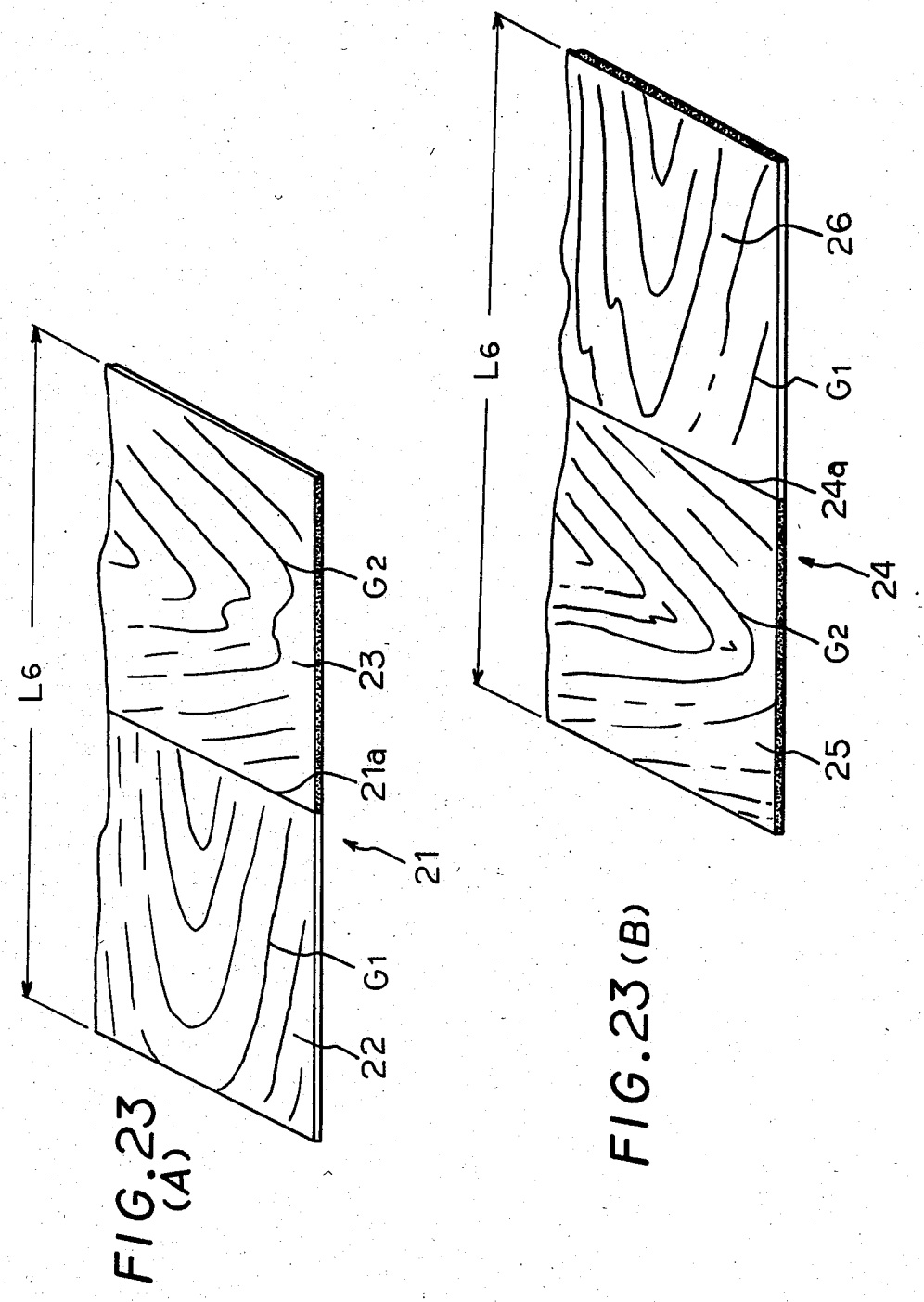

Reference is now made to FIG. 23 which shows two unit veneer sheets 21 and 24, each having two sections of undersized veneers 22, 23, and 25, 26 respectively, which are jointed together at the lines of abutment 21a, 24a into unit veneer sheets having the length L6, respectively. In the unit veneer sheet 21, its undersized veneer 22 has its grain G1 extending in the direction of the length L6, and the other veneer 23 has its grain G2 extending thereacross. With reference to the unit veneer sheet 24, its undersized veneer 25 has its grain G2 extending across the length L6 and the other veneer 26 has its grain G1 therealong. The dimensions of the respective undersized veneers 23, 23, 25 and 26 as measured along the length L6 are preferably made greater than the length l6 (FIGS. 24 and 25) of the intervals at which the unit veneer sheets 21 and 24 will be offset from one another in the lamination thereof when making a continuous length of glued laminated wood so that the abutment lines 21a and 24a may not appear on the faces of the resulting product. As to the veneer sections 22 and 26 having their grains G1 extending along the length L6, the dimensions thereof along the length L6 should preferably be the sum of said interval length l6 and a dimension which is greater than five times, or more preferably in the range of from 15 to 150 times, the thickness of the veneer sheets 21, 24, to avoid a decrease in strength of the resulting product due to the abutment lines 21a and 24a being formed close to the adjacent lapping ends of the successive overlying unit veneer sheets in the laminated wood structure. In the illustration of FIG. 23, the two unit veneer sheets 21 and 24 are made substantially symmetrical with respect to the jointing lines 21a and 24a, respectively.

The glued laminated wood 27 which is made from the combination of the above two kinds of unit veneer sheets 21 and 24 is exemplified in FIG. 24. In this particular embodiment, the unit veneer sheets are arranged and laid up in the ratio of two of the veneer sheets 21 to one of the veneer sheets 24, whereby glued laminated wood having a composite cross-banded structure is created, as seen at the side section thereof in FIG. 24. Though not shown in the drawings, various embodiments of laminated wood having the unit veneer sheets arranged in ratios other than the above two-to-one, e.g. one veneer sheet 21 to any desired number of veneer sheets 24, three veneer sheets 21 to any desired number of veneer sheets 24, and so forth, may be contemplated.

FIG. 25 exemplifies another embodiment which is similar to that of FIG. 24, but whose component unit veneers have inwardly beveled ends, as shown.

As will now be apparent, the present invention can be utilized in making various types of glued laminated wood, including laminated wood having parallel laminated veneers as well as cross-banded structure, depending upon the orientation of the wood grains of the component veneers and the selected combination of undersized veneers used in making the component unit veneer sheets. Since each type of laminated wood has its own applications it will be apparent that each of the previously described embodiments has a particular use.

It would be preferable that the veneer sheets be used in the making of glued laminated wood according to the invention have a thickness in the range of from 1 to 4 mm. Since the stepped deformation of each veneer sheet which occurs during the process makes use of its inherent flexibility, the greater the thickness of the veneer sheets, the more difficult it will be to successfully make the product. With this and the above range of preferred thicknesses of veneer sheets taken into consideration, the practical range of thicknesses of the resulting product will be from about 6 to 50 mm. Depending upon the veneer thickness and other factors, the present invention will exhibit a remarkable advantage in terms of economy when the component unit veneer sheets have dimensions of from 100 to 1,000 mm in the L direction. As to the number of plies in the laminated wood, any desired number can be selected, preferably from within the range of from 3 to 12 plies according to various factors including the desired thickness of product to be made, the veneer thickness to be used, the particular wood species of which the veneer is made, and so on.

The method of manufacturing glued laminated wood, including plywood according to the present invention will now be explained with reference to FIGS. 26 to 31:

FIG. 26 shows a schematic diagram illustrating the basic procedural steps for manufacturing the continuously produced product, which include a gluing (adhesive applying) process or station designated generally by reference letter A, followed sequentially by a laying-up process or station B, a tacking station C, a cutting station D, and a final bonding station E.

In the gluing station A, a series of unit veneer sheets 2 each having the same length L and thickness are arranged with their respective leading ends lapped on the trailing ends of the preceding veneer sheets as shown in the drawing. In such arrangement, they are conveyed face-up by conveyor 28 in the direction of the arrow successively beneath a glue spreader 38, which coats the upper surfaces of the veneer sheets 2 with a continuous film of glue which covers only the exposed surfaces thereof, the glue being indicated by the dots GL in the drawing. The coating of glue may be accomplished by use of any suitable glue applying apparatus such as the glue spreader 38 shown schematically in FIG. 26, a curtain coater, a film-glue applying device which is disclosed in the Canadian Patent Application No. 418,699 filed on Dec. 29, 1982 by Meinan Machinery Works, or any other conventional means. Anyway, the gluing process A is performed in such a way that no glue is applied to the opposite underside surface of each veneer sheet 2, or on the lapped upwardly facing portion at the trailing end of the veneer sheet. The length of overlap of each veneer sheet on the other is nominally equal to the quotient determined by dividing the unit veneer length L by the number N of plies to be in the laminated wood structure, i.e. the same length as the length l of offset of the veneer sheets in the laying-up operation which follows.

As thus coated with glue, the unit veneer sheets 2 are transferred to the subsequent lay-up station B, by sequentially dropping the sheets 2, as indicated by arrows F, from the conveyor 28. On the laying-up conveyor 28a, each veneer sheet 2 is lapped only on the glued portion of its preceding sheet, thereby exposing only the unglued portions of the veneer sheets. That is, in the laying-up station B each veneer sheet 2, which in the illustrated laying-up station has reversed its direction of movement from that of the gluing conveyor 28, is laid on the preceding veneer with its now unglued leading end exposed as a result of the continuous or indexing movement of the preceding veneer sheet. It will therefore be apparent that the lapped length portion, or glue coated portion, on each veneer sheet is substantially equal to $L - L/N$.

As thus laid-up in a continuous, sequentially overlapped length, the series of veneer sheets 2 are conveyed on conveyor 28a to the tracking station C, which includes a cold press (not shown) or any other convenient device, such as a stapler, a hot-melt glue applicator, etc., designed to temporarily hold the individual laid-up veneer sheets 2 together in a laminated form which maintaining the correct relative positions thereof.

The continuous lamination of veneers thus formed is transferred to the subsequent cutting station D, where it is cut into the desired panel lengths. The panels are then moved to the bonding station E which includes a device, such as a hot press, designed to cure the layers of glue between the veneer sheets while pressing them to permanently set them in their desired deformed shapes having the tandemly arranged and displaced straight length portions 1b and curved length portions 1c (FIG. 1). As will be noted from FIG. 1, during the bonding operation at the station E, each straight length portion 1b is displaced, in the direction of the thickness T of the product, by a distance substantially equal to the thickness t of its adjacent veneer sheet. Of course, if the product is made of veneers having varying thicknesses, the extents to which its straight length portions are displaced will be correspondingly varied. For example, in a typical hot press operation, pressure on the order of about 7 to 21 kg/cm$^2$ (or about 3,000 to 9,000 lbs/ft$^2$) is applied at a temperature of about 120° to 176° C. to cure the glue between the veneers and permanently set and bond them together.

In the described method of manufacturing glued laminated wood, it is desirable during the gluing process A that glue should be applied to each veneer sheet 2 leaving an appropriate unglued portion to allow very little of the glue to be exposed when it is laid up on the preceding veneer sheet in the subsequent laying-up process B. For example, in an arrangement of veneer sheets 2 in the laying-up process B wherein each pair of adjacently opposite ends 2a, 2b of two overlapped veneer sheets 2 have their ends in vertical alignment with each other as exemplified by full lines in the fragmenting side elevational showing of FIG. 27, each veneer sheet 2 will have an exposed portion of its surface on either face which is exactly equal to the distance of L/N (wherein L represents the longitudinal dimension of each unit veneer sheet 2; and N the number of veneer plies in the laminated wood to be made). As stated earlier, in connection with the description of the product itself, the above-said distance, and therefore the surface area to be exposed, varies depending upon the shapes of the veneer ends, the sizes thereof, the relative positions of each pair of the adjacently opposite ends 2a, 2b, etc. For example, when the edges of each pair of corresponding veneer sheet ends 2a and 2b are arranged or laid up in other ways such that one end overlaps the other a distance S, or such that the ends 2a, 2b are not in transverse alignment, but are spaced apart from each other in the longitudinal direction a distance S', as indicated by phantom lines in FIG. 27 respectively, the unglued area to be exposed should be decreased in the case of overlapping relation S, and increased when they are to be spaced apart as shown by S', respectively. In either event, it is desirable that each veneer sheet 2 have glue applied at station A in a way such as to maintain the appropriate unglued areas which will be exposed at the laying-up station B (FIG. 26).

Although maintenance of such unglued portion on each veneer sheet 2 may be accomplished by properly controlling the glue applying device 38, it is more convenient to apply glue in a continuous manner to the series of veneer sheets 2 which are successively lapped at their ends using the appropriate lapping distance, thus permitting the use of any known type of glue applying device. The length over which the respective ends of adjacent veneer sheets 2 are lapped on the gluing conveyor 28 (FIG. 26) and as will provide the unglued areas is determined by the lengthwise dimension of the surface area to be exposed in the laying-up process B (FIG. 26), which is the length interval l at which the veneers are laminated in offset relation to each other. When the paired ends 2a, 2b of the upper and lower veneer sheets 2 in the laying-up process B are themselves to be longitudinally overlapped as indicated by S, or are going to be longitudinally spaced apart from each other as at S' in FIG. 27, the lengths over which the ends of any two adjacent veneer sheets 2 are lapped in the gluing process A will be decreased or increased, accordingly, as indicated by phantom lines in FIG. 28. Regarding the value of S or S', depending upon the usage of the glued laminated wood each is preferably within the range of less than 50 times or, more preferably, less than 5 times, the thickness of the unit veneer sheet 2 to be employed in making the product. Though it is ideal that the area of unglued surface obtained in the gluing process A and the area of surface to be exposed in the subsequent laying-up process B should exactly coincide, errors are unavoidable in actual practice during both the gluing and the laying-up processes A and B. To compensate for such errors, any practical adjustment may be made, as by increasing or decreasing the areas of the unglued surfaces in the gluing station, etc.

FIGS. 29 and 30 respectively illustrate two types of flight conveyors which may be used to transport the veneer sheets 2 while retaining the correct overlapping relation between them during either the gluing process A or the laying-up process B (FIG. 26). The conveyor 28 shown in FIG. 29 includes several conveyor belts (only one of which is shown in the drawing) having veneer sheet locating steps 29, for receiving the trailing ends of the veneer sheets. The conveyor 30 in FIG. 30 includes several conveyor belts (only one of which is shown in the drawing) having veneer sheet locating pins 31 projecting therefrom, for the same purpose. By placing each veneer sheet 2 onto the conveyors whether in automatic, semi-automatic or manual manner, it will be transported while being located and overlapped correctly in the longitudinal direction. Thus, a high standard of accuracy and stability in veneer positioning can be achieved during the transporting of the veneer sheets through either the gluing or the laying-up processes.

Referring now to FIG. 31, to permit the gluing and laying-up processes to be carried out in close conjunction with each other in order to synchronize the relative positioning of the veneer sheets in the two processes, a common drive 32 is provided for directly driving the conveyor 28 for the gluing station A and for driving the conveyor 28a for the laying-up station B via any suitable speed-reducing device 33, as shown schematically in FIG. 31. By such drive arrangement, the two different processes A and B can be operatively synchronized so that error, if any, between the rates of travel of the veneer sheets during the two processes will take place at a given, and therefore, predictable, value. Therefore, adjustment for compensating the error may be made with ease.

If the drive 32 operates in a continuous manner, a cold press of a continuous type may be used in the tacking station C. If the drive 32 is capable of automatically interrupted operation, it is possible to employ a cold press having intermittent operation for the tacking process C.

When it is permissible for the glue coating on the veneer sheets 2 to be exposed in the subsequent laying-up process B, or when it is intended to have such exposure of glue on the product, the gluing process A may be conducted without maintaining the above-mentioned specific unglued areas on the veneer surfaces. For example, the veneer sheets 2 may be merely passed through the glue spreader 38 (FIG. 26) one after another in end-to-end relationship, without lapping their ends as shown in FIG. 28, so as to coat the glue on the entire surface of each veneer sheet. By so doing, a continuous length of glue exposure will appear on the face or faces of the continuously laid-up veneer sheets 2 formed in the laying-up station B. Such exposure of glue on the laid-up veneers is permissible or even desired, depending upon the type of laminated wood panel to be produced. For example, the glue which is exposed on the face can facilitate the application of an additional layer of overlay of a flat sheet of veneer, printed paper, board or any other suitable overlay material O which would be laminated onto the face or faces of the product, as illustrated in FIG. 32. The overlay sheet O may be added during or after the laying-up process, as desired.

Thus, it is to be understood that the particular embodiment of the method of manufacturing glued laminated wood according to the invention, specifically with reference to the gluing process A, will vary depending upon its intended relationship with the subsequent laying-up process B. Thus, the gluing method may be conducted in a variety of ways other than those described above.

With regards to the manner in which the gluing and laying-up stations A and B are disposed relative to each other for transferring the veneer sheets from the former to the latter, they may be located on the same level by arranging the gluing station A on the upstream side and the laying-up station B on the downstream side with reference to the direction of transfer of the veneer sheets 2, although they are located on different levels in the embodiment of FIG. 26. Furthermore, these two porcesses A and B may be arranged in line with each other, wherein the conveyor 28a is moved in the same direction as the conveyor 28, without being reversed as in the illustrated embodiment of FIG. 26, and instead each veneer sheet 2 coated with glue in the gluing station A is turned by reversing the leading and trailing ends thereof before it is transferred to the subsequent laying-up station B to be lapped on the glued portion of its preceding sheet. Therefore, these two stations may be operatively connected in any manner according to any specific requirements.

Furthermore, in the method of laminated wood manufacturing shown in FIG. 26, the tacking process C may be either replaced by, or immediately followed by the bonding process E by substituting or adding a hot press of a type designed to operate in a continuous or intermittent manner, whereupon the laying-up process B and the final bonding process E can be integrated into a wholly continuous process. In such an arrangement, the continuously produced glued laminated wood can be cut into any desired lengths in the cutting process D which would then follow the bonding process E. Thus, any desired lengths of laminated wood panels can be produced from a continuously produced run of glued laminated wood.

The present invention contemplates glued laminated wood having a novel laminated structure of veneers, which makes possible the formation of laminated wood of any desired length from veneer sheets which are too short or too narrow for such desired length of the product, thus permitting economical usage of veneer.

Regarding other general considerations associated with veneer or laminated wood making such as the kind of wood to be used, thickness, size, how to to deal with lathe checks on the veneer surfaces, number of plies, adhesives to be used, moisture content in veneers, etc., none are affected in any way by the practice of the present invention, but are subject to ordinary practices in glued laminated wood making.

While the invention has been illustrated and described with reference to various specific embodiments, it is to be understood that various modifications in the details of the glued laminated wood construction or its method of manufacture may be made without departing from the spirit and scope of the invention.

What is claimed is:

1. Glued laminated wood having N-layers of veneer sheets and cut from a substantially continuously producible length of glued laminated wood formed by laying up and laminating successively lapped unit veneer sheets, each unit veneer sheet having a length L as measured in the direction of said laying-up and a thickness t, and said unit veneer sheets being successively offset from each other in the direction of said laying-up at a length interval l with respect to its underlying unit veneer sheet, each of said unit veneer sheets as it appears in said continuously producible length of glued laminated wood having N-number of straight length portions which are disposed in tandem relation and successively displaced from each other in the direction of the thickness of said continuously producible length of glued laminated wood a distance substantially equal to said thickness t, said length interval l being substantially equal to L divided by N, and each said unit veneer sheet as it appears in said continuously producible length of glued laminated wood further having a curved length portion between each successive pair of its said straight length portions, all of said unit veneer sheet straight length portions being parallel to each other, and each of said unit veneer sheets extending through said thickness of said continuously producible length of glued laminated wood from one surface thereof to the other with the endmost of its said straight length portions forming respective portions of the opposite faces of said continuously producible length of glued laminated wood.

2. Glued laminated wood according to claim 1, wherein said length interval l is substantially equal to L divided by N.

3. Glued laminated wood according to claim 1, wherein said length interval l is within the range of from L divided by N plus 50 times said thickness t of each said unit veneer sheet, to L divided by N minus 50 times said thickness t of each said unit veneer sheet.

4. Glued laminated wood according to claim 3, wherein said length interval l is within the range of from L divided by N plus 5 times said thickness t of each said unit veneer sheet, to L divided by N minus 5 times said thickness t of each said unit veneer sheet.

5. Glued laminated wood according to claim 1, wherein each said unit veneer sheet comprises a solid sheet of veneer having said length L.

6. Glued laminated wood according to claim 1, wherein each said unit veneer sheet comprises at least two undersized sheets of veneer which are jointed together to form said unit veneer sheet.

7. Glued laminated wood according to claim 6, wherein each said undersized sheet of veneer which is disposed at an end of said unit veneer sheet has a length, as measured in the direction of said length L, which is greater than said length l.

8. Glued laminated wood according to claim 6, wherein each said undersized sheet of veneer which is disposed at an end of said unit veneer sheet has a length, as measured in the direction of said length L, which is substantially equal to the sum of said length interval l and a dimension which is from about 5 to about 150 times said thickness t of said unit veneer sheet.

9. Glued laminated wood according to claim 6, wherein said undersized sheets of veneer are jointed together in end-to-end relation with reference to the directions of their respective wood grains.

10. Glued laminated wood according to claim 6, wherein said undersized sheets of veneer are jointed together in end-to-side relation with reference to the directions of their respective wood grains.

11. Glued laminated wood according to claim 1, wherein each said unit veneer sheet has opposite ends at least one of which is beveled, whereby at least one face of said plywood is substantially smooth.

12. Glued laminated wood according to claim 1, which further comprises overlay material laminated onto at least one of the faces of said glued laminated wood.

* * * * *

UNITED STATES PATENT AND TRADEMARK OFFICE
CERTIFICATE OF CORRECTION

PATENT NO. : 4,584,222

DATED : April 22, 1986

INVENTOR(S) : MASAKUNI IWAMOTO

It is certified that error appears in the above-identified patent and that said Letters Patent is hereby corrected as shown below:

Column 10, line 42, between "wood" and "dimension", --the-- should be inserted.

Column 11, line 7, the word "enter" should be --center--.

Column 11, line 17, after "veneer" and before the numeral "11", "sheel" should be --sheet--.

Column 11, line 28, between "the" and "laminated", the word --glued-- should be inserted.

Column 12, line 13, the first occurrence of numeral "23" should be --22--.

Column 13, line 52, after "subsequent", "lay-up" should be --laying-up--.

Column 14, line 1, after "the" and before "station", "tracking" should be --tacking--.

Column 14, line 6, the first word in the line "which" should be --while--.

UNITED STATES PATENT AND TRADEMARK OFFICE
CERTIFICATE OF CORRECTION

PATENT NO. : 4,584,222

DATED : April 22, 1986

INVENTOR(S) : MASAKUNI IWAMOTO

It is certified that error appears in the above-identified patent and that said Letters Patent is hereby corrected as shown below:

Column 18, lines 4, 5, and 6 should be deleted.

Column 18, line 47, after "said", "plywood" should be --glued laminated wood--.

Signed and Sealed this

Sixteenth Day of September 1986

[SEAL]

Attest:

DONALD J. QUIGG

Attesting Officer

Commissioner of Patents and Trademarks